UNITED STATES PATENT OFFICE.

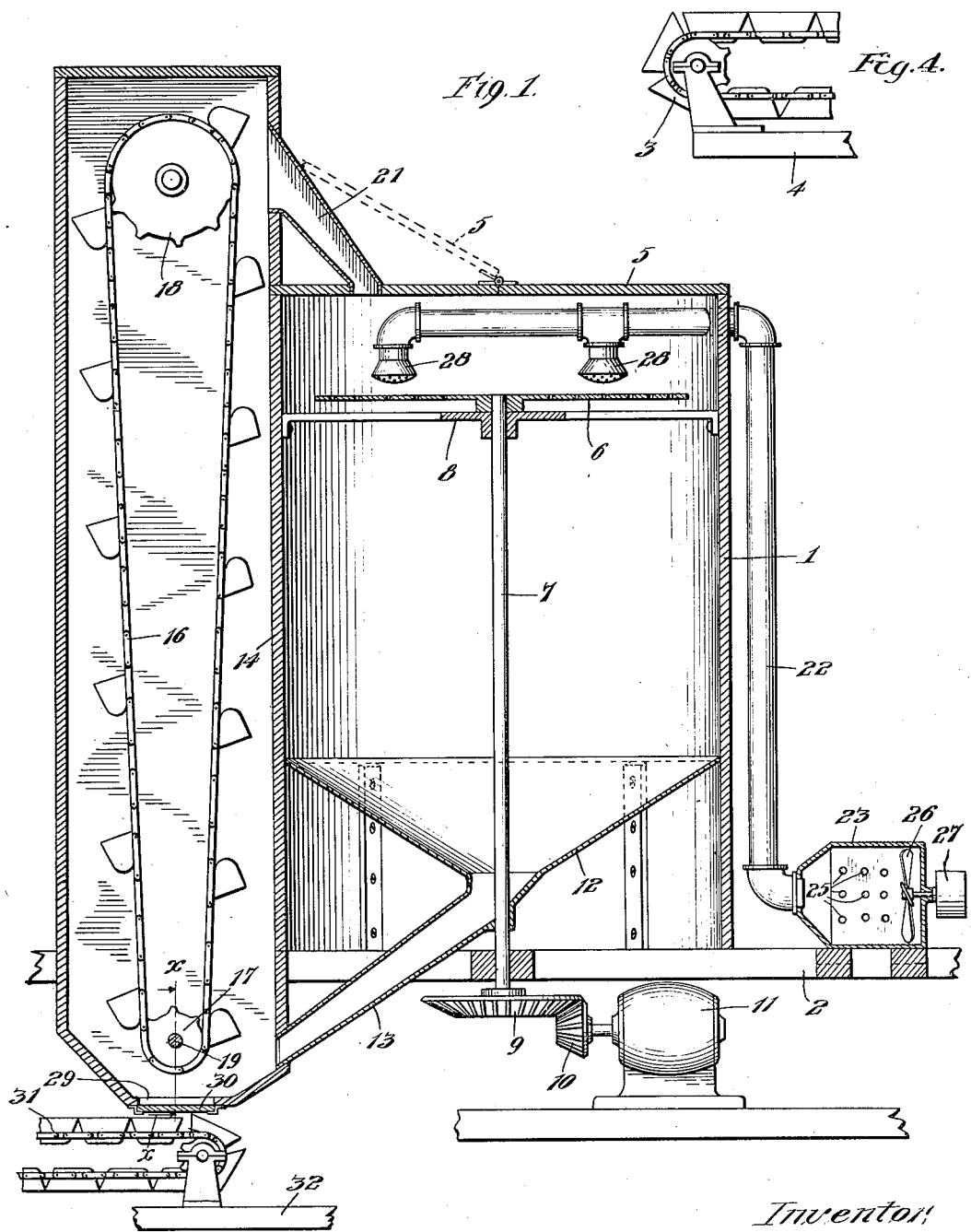

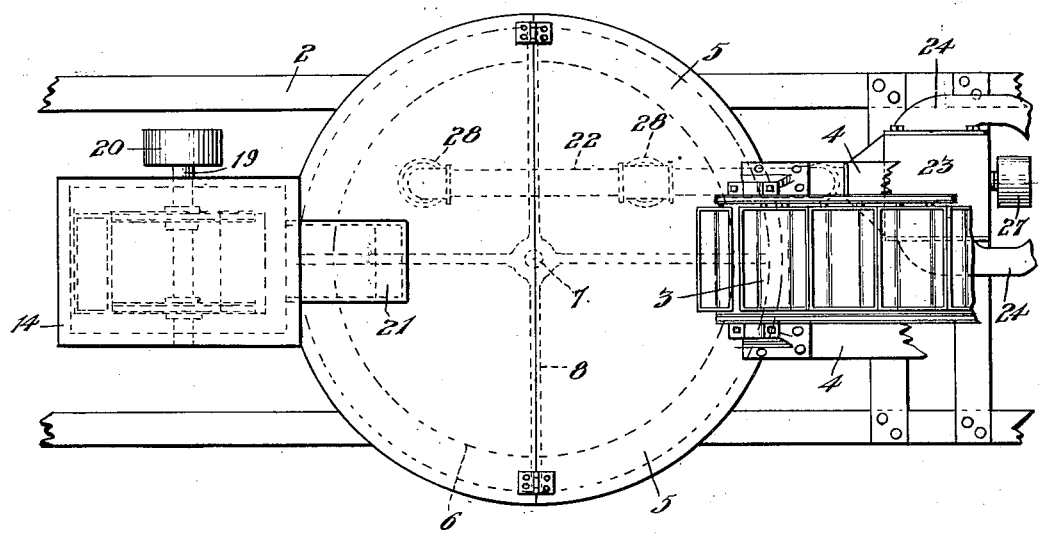
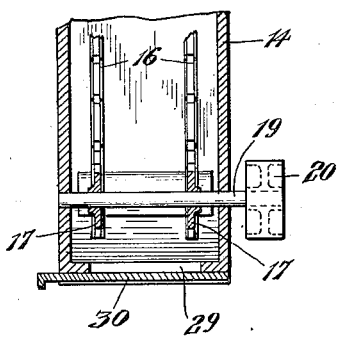

PAYTON J. H. MOORE, OF CHICAGO, ILLINOIS, ASSIGNOR, BY DIRECT AND MESNE ASSIGNMENTS, TO AMERICAN GRAIN DEODORIZING CO., A CORPORATION OF ILLINOIS.

APPARATUS FOR TREATING GRAIN.

1,220,160. Specification of Letters Patent. Patented Mar. 20, 1917.

Application filed April 9, 1914, Serial No. 830,738. Renewed July 22, 1916. Serial No. 110,772.

*To all whom it may concern:*

Be it known that I, PAYTON J. H. MOORE, a citizen of the United States, and a resident of the city of Chicago, county of Cook, and State of Illinois, have invented certain new and useful Improvements in Apparatus for Treating Grain, of which the following is a specification.

My invention relates to apparatus for treating grain preparatory to the storage thereof in bins, grain elevators and like places and has for its object the production of apparatus for so treating grain as to prevent deterioration thereof through destructive bugs or bacteria which are mingled with the grain as harvested. Other objects will appear hereinafter.

My invention consists in the apparatus hereinafter described and claimed.

The invention will be best understood by reference to the accompanying drawings forming a part of this specification, and in which, Figure 1 is a central vertical section of a sterilizing apparatus embodying my invention, Fig. 2 is a top plan view thereof, Fig. 3 is a detail section taken on line x—x of Fig. 1 and Fig. 4 shows the conveyer emptying into bin 1.

The preferred form of construction as illustrated in the drawings comprises a cylindrical bin or chamber 1 which is suitably supported upon a supporting structure 2. Arranged above the bin 1 is a conveyer 3 supported upon suitable frame-work 4. The conveyer 3, when the apparatus is in use, is adapted to convey the grain which it is desired to treat from its place of storage and deposit the same into the upper end of bin 1. Said bin is provided with a suitably hinged door 5 which permits of such introduction of the grain, said door being adapted however, during the sterilizing process, to effectually close the upper end of the bin in order to form an absolutely tight chamber therein.

Rotatably mounted within the bin 1 at the upper end thereof is a horizontally disposed circular table 6 which is fixed to the upper end of a vertically disposed centrally positioned shaft 7. The upper end of said shaft is suitably mounted in bearings provided in a web 8, the lower end being mounted in suitable bearings provided in the frame-work 4. Said shaft is driven through the medium of meshing beveled gears 9 and 10 from a motor 11.

The grain which is introduced into the upper end of the bin 1 is deposited onto the table 6 whence it subsequently falls, being thrown outwardly by centrifugal force, dropping to the lower end of the bin through the space which intervenes between the periphery of said table and the lateral wall of the bin. The lower end of the bin is provided with a hopper bottom 12 from which leads an inclined outlet chute 13. The outer end of chute 13 communicates with the lower end of the housing 14 of an endless bucket elevator 16 which is mounted for travel around sprocket wheels 17 and 18 as clearly shown in Fig. 1. The sprocket wheels 17 are fixed to a shaft 19 which is equipped at one end with an exteriorly positioned pulley 20 whereby said shaft may be connected with any suitable source of driving power in order to drive the elevator 16. Said elevator serves to elevate the grain introduced into the lower end of housing 14 and deposit the same into a chute 21 which communicates as shown with the upper end of the bin 1, being adapted to direct the grain introduced into said chute to position upon the table 6.

Communicating with the upper end of the bin 1 is a pipe 22 the lower end of which leads from a casing 23 with the opposite sides of which communicate pipes 24 for supplying ozone or other sterilizing agent or fluid which may be used, the side walls of the casing 23 being provided with perforations 25 as clearly shown in Fig. 1 for admitting the ozone to the interior of said casing. Arranged within said casing at the rearward end thereof is a fan 26 which is driven, when in use, through the medium of an exteriorly positioned pulley 27. Said fan, when rotated, is adapted to force the ozone from the casing 23 into the pipe 22, said ozone being discharged from the upper end of said pipe through nozzles 28 positioned in the upper end of the bin 1 directly over the table 6.

Provided at the lower end of the housing 14 is a discharge opening 29 which is normally closed by a sliding closure 30. Below said discharge opening is provided a conveyer 31 adapted to accommodate the grain discharged from said opening and convey the same to any place desired for storage.

In the operation of the apparatus the grain is first introduced into the upper end of the bin by the conveyer 3, with the door 5 in open position as shown in dotted lines in Fig. 1. After the desired amount of grain has been introduced into the bin the closure 5 is rocked to closing position. By reason of the rotary movement of said table and the resulting centrifugal force the grain which is deposited onto said table is spread in a thin layer, the centrifugal force especially resulting in the outward movement of the grain toward the periphery of said table whence the same drops downwardly in the bin through the space intervening between said table periphery and the lateral wall of the bin. During the time that the grain remains upon the table 6 it is subjected to a bath of ozone which is directed toward the table from the nozzles 28. The spreading of the grain upon the table results in each kernel being bathed or enveloped in the ozone so that each kernel will be thoroughly sterilized. Said table is perforated as shown in order to permit of the passage of the ozone therethrough and thereby further conduce to the thorough circulation of the ozone between the kernels of grain positioned upon the table. After the grain drops from said table it is directed by the hopper bottom 12 and chute 13 into the lower end of housing 14, whence the same is elevated by elevator 16 and discharged into chute 21 which again deposits the grain onto the table 6. Thus the grain may again and again be circulated through the apparatus in order to thoroughly subject the same to the action of the ozone and thereby to effect thorough sterilization thereof. With the construction set forth it will be seen that the apparatus is completely inclosed so as to prevent the escape of the ozone and permit of its circulation from the bin to the housing 14 and the passages leading to and from these parts and thereby conduce to a more thorough treating of the grain since the latter will be subjected to the action of the ozone during all of the time that it remains in the apparatus and not only when positioned upon the table. Exhaust of the ozone from the device after the same has been spent, is of course effected by simply opening the door 5. When the treatment of a "charge" is completed the same is discharged from the apparatus by opening the slide 30 as will be readily understood.

With the apparatus set forth grain may be sterilized preparatory to storage so as to prevent deterioration through destructive bugs or bacteria which ordinarily are mingled with the grain when harvested and threshed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. Apparatus for sterilizing grain comprising a chamber; means for introducing the grain to be treated into said chamber; means for circulating through said chamber the grain introduced therein; means for spreading the grain into a thin layer in the course of its passage through said chamber; and means for introducing a sterilizing gas into said chamber, substantially as described.

2. Apparatus for sterilizing grain comprising a chamber; a rotatably mounted table arranged in said chamber onto which the grain introduced into said chamber is deposited; and means for introducing a sterilizing fluid into said chamber, substantially as described.

3. Apparatus for sterilizing grain comprising a chamber; a rotatably mounted table arranged in said chamber onto which the grain introduced into said chamber is deposited; and means for introducing a sterilizing fluid into said chamber and directing it toward the upper side of said table, substantially as described.

4. Apparatus for sterilizing grain comprising a chamber; a moving table arranged in said chamber onto which the grain introduced into the upper end of said chamber is deposited and whence it is dropped to the lower end of said chamber; means for conveying the grain from the lower end of said chamber and depositing it again into the upper end of said chamber; and means for introducing a sterilizing agent into said chamber, substantially as described.

5. Apparatus for sterilizing grain comprising a chamber; a moving table arranged in said chamber onto which the grain introduced into the upper end of said chamber is deposited and whence it is dropped to the lower end of said chamber; means for conveying the grain from the lower end of said chamber and depositing it again into the upper end of said chamber; and means for introducing a sterilizing agent into said chamber and directing it toward the upper side of said table, substantially as described.

6. Apparatus for sterilizing grain comprising a chamber; a moving table arranged in said chamber onto which the grain introduced into the upper end of said chamber is deposited and whence it is dropped to the lower end of said chamber; an endless bucket elevator for conveying the grain from the lower end of said chamber and depositing it again into the upper end of said chamber; and means for introducing a sterilizing gas into said chamber, substantially as described.

7. Apparatus for sterilizing grain comprising a chamber; a rotatable substantially horizontally disposed table arranged in the upper end of said chamber onto which the grain introduced into the upper end of said chamber is deposited and whence it is dropped to the lower end of said chamber, the periphery of said table being spaced from the lateral wall of said chamber; an outlet passage at the lower end of said chamber; means for conveying the grain from said outlet passage and depositing it again into the upper end of said chamber; and means for introducing a sterilizing gas into said chamber, substantially as described.

8. Apparatus for sterilizing grain comprising a chamber; a moving table arranged in said chamber onto which the grain introduced into the upper end of said chamber is deposited and whence it is dropped to the lower end of said chamber; means for conveying the grain from the lower end of said chamber and depositing it again into the upper end of said chamber; means for introducing a sterilizing agent into said chamber; and a nozzle positioned above said table for directing a sterilizing agent toward the upper end of said table, substantially as described.

9. Apparatus for sterilizing grain comprising a chamber; a movable foraminated table arranged in said chamber onto which the grain introduced into the upper end of said chamber is deposited and whence it is dropped to the lower end of said chamber; means for conveying the grain from the lower end of said chamber and depositing it again into the upper end of said chamber; and means for introducing a sterilizing agent into said chamber, substantially as described.

10. Apparatus for sterilizing grain, comprising a closed chamber; means for introducing the grain to be treated into said chamber; means for circulating the grain introduced into said chamber through the latter; and means for introducing a sterilizing agent into said chamber, substantially as described.

In testimony whereof I have signed my name to this specification in the presence of two subscribing witnesses.

PAYTON J. H. MOORE.

Witnesses:
JOSHUA R. H. POTTS,
HELEN F. LILLIS.